(12) United States Patent
Sankaranarayanan et al.

(10) Patent No.: US 12,105,813 B2
(45) Date of Patent: Oct. 1, 2024

(54) SECURE ON-PREMISES TO CLOUD CONNECTOR FRAMEWORK

(71) Applicant: Oracle International Corporation, Redwood Shores, CA (US)

(72) Inventors: Hari Bhaskar Sankaranarayanan, Bangalore (IN); Harsh Vardhan Rai, Bengaluru (IN); Jean-Rene Gauthier, Temecula, CA (US)

(73) Assignee: Oracle International Corporation, Redwood Shores, CA (US)

( * ) Notice: Subject to any disclaimer, the term of this patent is extended or adjusted under 35 U.S.C. 154(b) by 399 days.

(21) Appl. No.: 17/554,010

(22) Filed: Dec. 17, 2021

(65) Prior Publication Data

US 2023/0195909 A1    Jun. 22, 2023

(51) Int. Cl.
*G06F 21/62* (2013.01)
*G06F 21/60* (2013.01)
*H04L 67/00* (2022.01)

(52) U.S. Cl.
CPC ........ *G06F 21/604* (2013.01); *G06F 21/6254* (2013.01); *H04L 67/34* (2013.01); *G06F 2221/2141* (2013.01)

(58) Field of Classification Search
CPC .............. G06F 21/604; G06F 21/6254; G06F 2221/2141; G06F 21/6218; H04L 67/34
See application file for complete search history.

(56) References Cited

U.S. PATENT DOCUMENTS

| | | | |
|---|---|---|---|
| 10,154,039 B1 * | 12/2018 | Andruschuk | H04L 63/20 |
| 10,198,399 B1 | 2/2019 | Fritchman et al. | |
| 10,216,744 B2 * | 2/2019 | Yap | G06F 16/119 |
| 11,513,772 B1 | 11/2022 | Gross | |
| 2008/0104393 A1 * | 5/2008 | Glasser | G06F 16/27 |
| | | | 713/165 |
| 2015/0163206 A1 * | 6/2015 | McCarthy | G06F 21/6227 |
| | | | 726/4 |
| 2018/0278500 A1 | 9/2018 | Feamster et al. | |

(Continued)

OTHER PUBLICATIONS

Unknown, Web Search History, Terms, 2024.

(Continued)

*Primary Examiner* — Joseph P Hirl
*Assistant Examiner* — Aayush Aryal
(74) *Attorney, Agent, or Firm* — Potomac Law Group, PLLC

(57) ABSTRACT

Embodiments implement a secure connector framework at a cloud infrastructure. Embodiments receive one or more notebook profiles from an on-premises system corresponding to a first cloud customer, the on-premises system comprising at least one of one or more datasets, one or more models, or one or more libraries, the notebook profiles comprising permission sets that specify a level of access to the datasets, the models and the libraries, the notebook profiles corresponding to an on-premises machine learning ("ML") notebook. Embodiments transform the received notebook profiles into a cloud policy set for sharing the datasets, the models and the libraries. Embodiments then transmit and receive corresponding data from the first cloud customer to a second cloud customer, the transmitted and received data based on the cloud policy set.

20 Claims, 13 Drawing Sheets

(56) References Cited

U.S. PATENT DOCUMENTS

| | | |
|---|---|---|
| 2020/0279003 A1 | 9/2020 | Dupont et al. |
| 2020/0358599 A1 | 11/2020 | Angel et al. |
| 2020/0364608 A1 | 11/2020 | Anwar et al. |
| 2021/0083855 A1 | 3/2021 | Polleri et al. |
| 2021/0182729 A1* | 6/2021 | George ............... G06N 20/00 |
| 2021/0209099 A1 | 7/2021 | Marsden et al. |
| 2021/0342725 A1 | 11/2021 | Marsden et al. |
| 2022/0067181 A1 | 3/2022 | Carley |
| 2022/0405065 A1 | 12/2022 | Appel et al. |
| 2022/0413821 A1* | 12/2022 | Cmielowski ............ G06F 9/541 |
| 2023/0319069 A1 | 10/2023 | Birch et al. |

OTHER PUBLICATIONS

Lu et al. "Securing Your Collaborative Jupyter Notebooks in the Cloud using Container and Load Balancing Services", Proc of the 19th Python in Science Conference, 9 pgs. 2020.

* cited by examiner

SECURE ON-PREMISES TO CLOUD CONNECTOR FRAMEWORK

FIELD

One embodiment is directed generally to a cloud computer network, and in particular to a connector to the cloud computer network for on-premises data.

BACKGROUND INFORMATION

Cloud service providers provide various services in the "cloud", meaning over a network, such as the public Internet, and remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users.

One service provided by cloud service providers is developing, training, and using machine learning models. The cloud makes it easy for enterprises to experiment with machine learning capabilities and scale up as projects go into production and demand increases. The cloud makes intelligent capabilities accessible without requiring advanced skills in artificial intelligence or data science. In conjunction with machine learning models, cloud services typically provide machine learning notebooks to facilitate the development and use of the models. Machine learning notebooks are highly-interactive multi-purpose tools that not only allow a developer or data scientist to write and execute code but, at the same time, analyze intermediate results to gain insights (using tables or visualizations) while working on a project.

Cloud service providers also offer federated learning. Federated learning (also referred to as "collaborative learning") is a machine learning technique that trains an algorithm across multiple decentralized edge devices or servers holding local data samples, without exchanging them. This approach stands in contrast to traditional centralized machine learning techniques where all the local datasets are uploaded to one server, as well as to more classical decentralized approaches which often assume that local data samples are identically distributed.

Federated learning enables multiple actors to build a common, robust machine learning model without sharing data. Therefore, federated learning can address critical issues such as data privacy, data security, data access rights and access to heterogeneous data. Federated learning is particularly relevant to industries where confidentiality of datasets is paramount, such as healthcare, life sciences and the financial sector.

In general, federated learning aims at training a machine learning algorithm, for instance deep neural networks, on multiple local datasets contained in local or on-premises nodes without explicitly exchanging data samples. The general principle includes training local models on local data samples and exchanging parameters (e.g., the weights and biases of a deep neural network) between these local nodes at some frequency to generate a global model shared by all nodes.

However, federated learning, as well as other cloud based services, rely on data sharing between locations. Therefore, there is a need for connections that are secure, particularly between on-premises and cloud locations.

SUMMARY

Embodiments implement a secure connector framework. Embodiments receive one or more notebook profiles from an on-premises system corresponding to a first cloud customer, the on-premises system comprising at least one of one or more datasets, one or more models, or one or more libraries, the notebook profiles comprising permission sets that specify a level of access to the datasets, the models and the libraries, the notebook profiles corresponding to an on-premises machine learning ("ML") notebook. Embodiments transform the received notebook profiles into a cloud policy set for sharing the datasets, the models and the libraries. Embodiments then transmit and receive corresponding data from the first cloud customer to a second cloud customer, the transmitted and received data based on the cloud policy set.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Embodiments provide a secure connection between on-premises and a cloud so that, for example, on-premises machine learning notebooks can be used by collaborators over the cloud. Embodiments use a secure connector framework so that models, datasets and libraries can securely remain on-premises while being selectively shared with the collaborators over the cloud.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
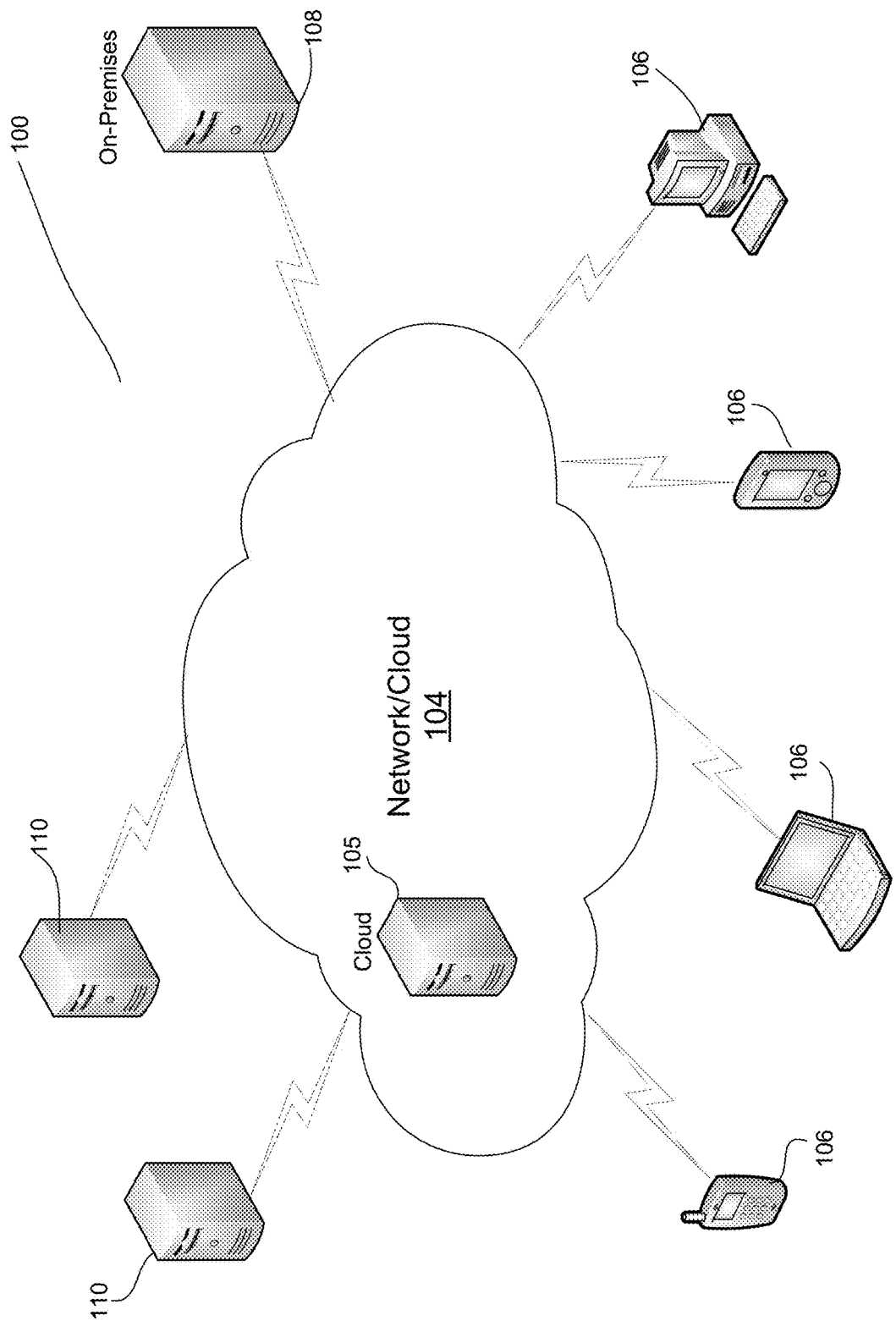
FIG. 1 illustrates an example of a secure on-premises to cloud connector framework system that implements functionality disclosed herein in accordance to embodiments.

FIG. 1 illustrates an example of a secure on-premises to cloud connector framework system 100 that implements functionality disclosed herein in accordance to embodiments. Secure on-premises to cloud connector framework system 100 may be implemented within a computing environment that includes a communication network/cloud 104. Cloud 104 may be a private network that can communicate with a public network (e.g., the Internet) to access services 110 provided by a cloud services provider. The functionality of secure on-premises to cloud connector framework system 100 is implemented by at least two different servers, as shown in FIG. 1, where one part of system 100 is implemented on-premises at server 108, and one part is implemented on cloud 104 at server 105. The functionality of system 100 includes functionality disclosed in detail below, including netbook profiles executed on on-premises server 108, and an IAM On-Premises Connector and a Notebook Secure Plugin that are executed on cloud 104 by cloud server 105 and interact with server 108 to implement the secure on-premises to cloud connector framework functionality. Examples of communication networks include a mobile network, a wireless network, a cellular network, a local area network ("LAN"), a wide area network ("WAN"), other wireless communication networks, or combinations of these and other networks. Network/cloud 104 may be administered by a cloud services provider, such as via the Oracle Cloud Infrastructure ("OCI") from Oracle Corp.

Tenants/customers of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with service provider, where an enterprise account encompasses or aggregates a number of individual user accounts.

System 100 further includes client devices 106, which can be any type of device that can access network 104 and can obtain the benefits of the functionality of secure on-premises to cloud connector framework system 100 as "collaborators" by utilizing machine learning models, datasets and libraries that are securely stored on-premises on server 108. As disclosed herein, a "client" (also disclosed as a "client system" or a "client device") may be a device or an application executing on a device. System 100 includes a number of different types of client devices 106 that each is able to communicate with cloud 104.

Figure 2:
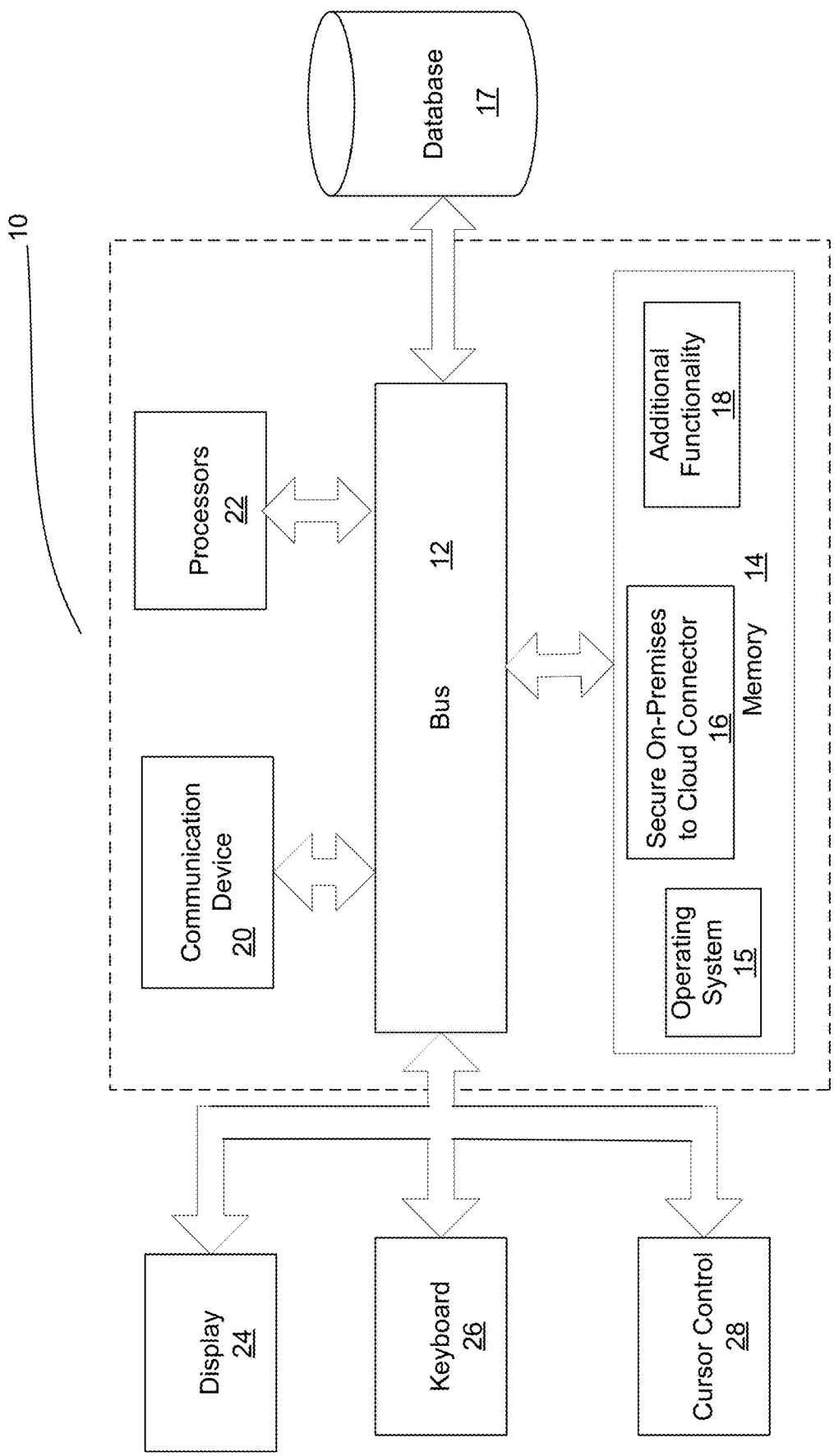
FIG. 2 is a block diagram of the secure on-premises to cloud connector framework system of FIG. 1 in the form of a computer server/system in accordance with an embodiment of the present invention.

FIG. 2 is a block diagram of secure on-premises to cloud connector framework system 100 of FIG. 1 in the form of a computer server/system 10 in accordance with an embodiment of the present invention. Server/system 10 can separately implement any of the components of FIG. 1, including using one system 10 to implement server 108, and a different system 10 to implement server 105. Although shown as a single system, the functionality of system 10 can be implemented as a distributed system. Further, the functionality disclosed herein can be implemented on separate servers or devices that may be coupled together over a network. Further, one or more components of system 10 may not be included, depending on the application.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a secure on-premises to cloud connector framework module 16 that uses machine learning notebooks to securely and selectively share on-premises models, datasets and libraries, and all other functionality disclosed herein. System 10 can be part of a larger system. Therefore, system 10 can include one or more additional functional modules 18 to include the additional functionality, such as functionality to implement machine learning notebooks. A file storage device or database 17 is coupled to bus 12 to provide centralized storage for modules 16 and 18, including machine learning models, datasets and libraries. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

Referring again to FIG. 1, in traditional machine learning environments, training data is generally centrally held by one organization executing a machine learning algorithm. Distributed learning systems extend this approach by using a set of learning components accessing shared data or having the data sent to the participating parties from a central party, all of which are fully trusted. For example, one known approach to distributed learning is for a trusted central party to coordinate distributed learning processes to a machine learning model. Another known approach is to use a parameter server. This again requires a fully trusted central party to distribute data among many additional parties and to collect and aggregate parameters learned by each party using their respective data shares.

However, some learning scenarios must address trust boundaries and/or applicable privacy legislation, particularly when multiple organizations or individuals are involved. Even though larger datasets improve the performance of trained models, organizations often cannot share data due to legal restrictions or competition between the organizations. As discussed above, federated learning addresses these more restrictive environments by allowing data holders to collaborate throughout the learning process rather than requiring a trusted third party to hold all of the data. Data holders in federated learning environments can run a machine learning algorithm locally and only exchange model parameters. Parameters are then aggregated and redistributed by one or more central entities.

However, federated learning environments in general fail to provide sufficient data privacy guarantees. To protect the privacy of the datasets, systems need to also consider inferences derived from the learning process and/or information that can be traced back to its source in the resulting trained model. Known attempts to ensure adequate data privacy guarantees in federated learning environments have resulted in poor predictive performance of the resulting model. For example, federated learning schemes using local differential privacy can result in the generation of an abundant amount of noise, which can deteriorate model performance.

Further, in a hybrid environment such as illustrated in FIG. 1, it is desired for datasets, machine learning models and software libraries to reside on-premises yet be available for collaboration with other entities to get better inputs. However, there is generally no known way to provide fine grained access to these on-premises assets over the cloud. This is true for hybrid environments where certain proprietary items will stay in the customer on-premises setup and yet they need to collaborate for getting better inputs on models, datasets, and libraries. For example, collaborative models such as "Google Colab" allow a user to work on a local, offline, on-premises machine learning notebook that is not connected to the cloud, but when connected to the cloud, the notebook and all corresponding models and data is then transmitted to the cloud where it is easily accessible by other users.

In contrast, embodiments provide a secure connector framework for operating in both on-premises environments, where the assets such as models, libraries, and datasets reside, and cloud environments. The framework includes machine learning ("ML") notebook profiles, a notebook plugin and IAM connectors that can enable the seamless transition of asset information and permissions across both environments. Therefore, on-premises customers can share information and find means to get feedback from partners and collaborators over the cloud. However, unlike with known solutions, in embodiments the datasets, models and libraries are never stored on the cloud (i.e., copied to the cloud to the extent that other cloud customers can access) where they are easily accessible by other cloud users.

Embodiments utilize ML notebooks in order to provide the secure on-premises to cloud connector framework. In general, ML or "data science" notebooks have become an integral tool for data scientists across the world. ML notebooks are highly-interactive multi-purpose tools that allow a data scientist to write and execute code and, at the same time, analyze intermediate results to gain insights, using tables or visualizations, while working on a project. Example ML notebooks include the open source "Jupyter Notebook" and "Apache Zeppelin" ML notebooks. In general, embodiments can be implemented with any type of ML notebooks that interface with an ML notebook server, including the Jupyter Notebook and any other Python based notebook (referred to generically as a "Python notebook").

In one embodiment, "Oracle Machine Learning Notebooks" from Oracle Corp. are implemented. Oracle ML Notebooks provide a collaborative user interface for data scientists and business and data analysts who perform machine learning in Oracle Autonomous Database—both Autonomous Data Warehouse ("ADW") and Autonomous Transaction Processing ("ATP"). Oracle Machine Learning Notebooks enable data scientists, citizen data scientists, and data analysts to work together to explore their data visually and develop analytical methodologies. An interface provides access to high performance, parallel and scalable in-database implementations of machine learning algorithms via SQL and PL/SQL, with support for Python and R. Oracle ML Notebooks use Apache Zeppelin technology, enabling teams to collaborate to build, assess, and deploy machine learning models. Multi-user collaboration enables the same notebook to be opened simultaneously by different users, such that notebook changes made by one user are instantaneously reflected to notebook viewers.

In general, a ML notebook includes a sequence of cells. A cell is a multiline text input field. The execution behavior of a cell is determined by the cell's type. For embodiments that implement the Jupyter Notebook, there are three types of cells: code cells, markdown cells, and raw cells. Every cell starts off being a code cell, but its type can be changed by using a drop-down on the toolbar (which will be "Code", initially), or via keyboard shortcuts, and each cell can be a multiline input file.

Figure 3:
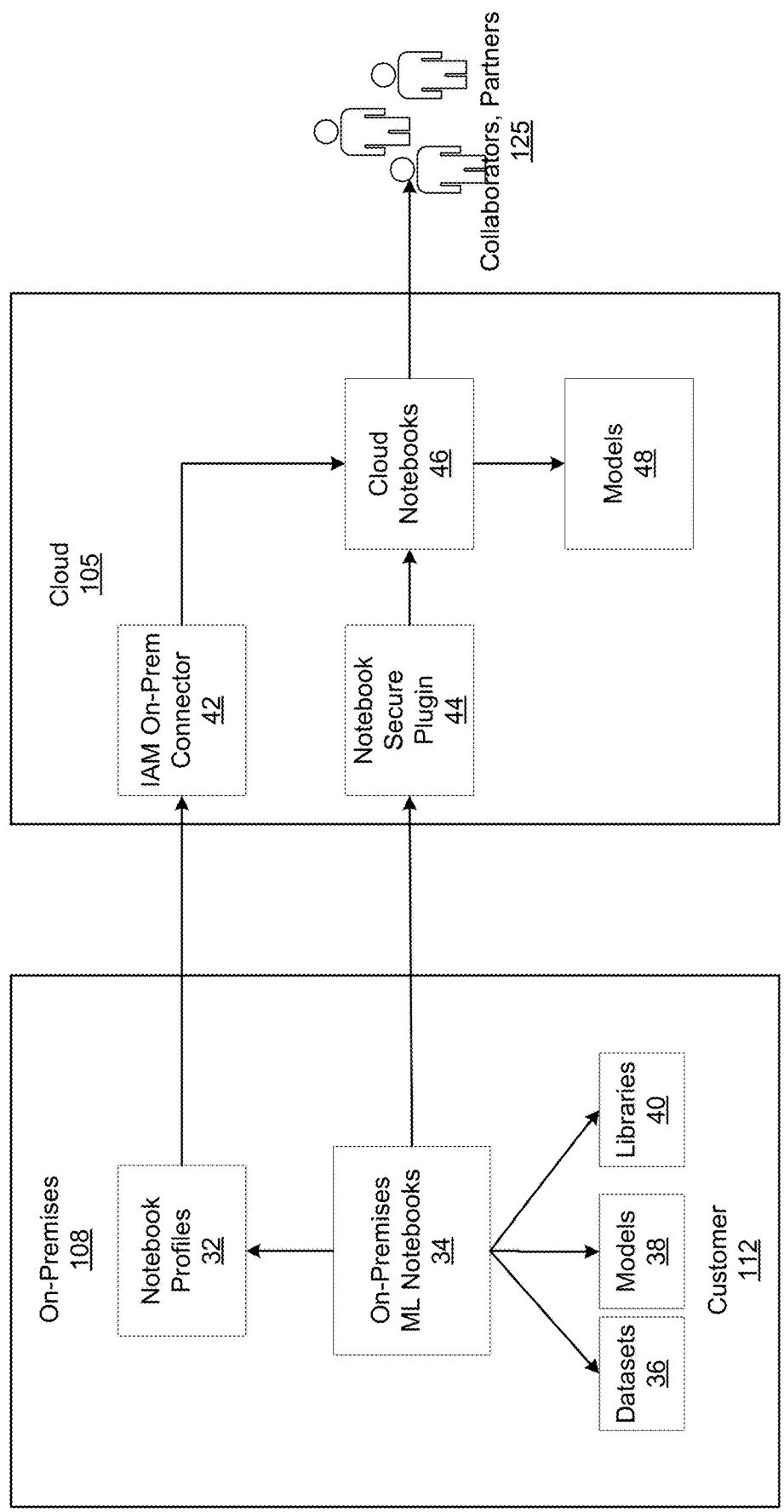
FIG. 3 is a block diagram of the system of FIG. 1 in accordance to embodiments.

FIG. 3 is a block diagram of system 100 of FIG. 1 in accordance to embodiments. FIG. 3 illustrates elements within the on-premises server/layer 108 for a particular customer 112 of cloud 104, and elements within the cloud server/layer 105. At on-premises 108, the customer has possession of various datasets 36, machine learning models 38 and machine learning libraries 40. Models 38 can by any type of machine learning model that, in general, is trained on some training data and then can process additional data to make predictions. Examples of models 38 include artificial neural networks ("ANN"), decision trees, support-vector machines ("SVM"), Bayesian networks, etc. The structure of the models may be unique and proprietary, so that customer 112 does not wish to expose these proprietary models to other customers of cloud 104 (e.g., collaborators/partners 125). Datasets 36 are used to train the models 38 and also may be proprietary data that customer 112 does not wish to share with other customers of cloud 104. Similarly, machine learning libraries 40 may include common learning algorithms and utilities, including classification, regression, clustering, collaborative filtering, dimensionality reduction, and underlying optimization primitives, etc., and may also be proprietary to customer 112.

On-premises layer 108 further includes one or more on-premises ML notebooks 34. In embodiments, each ML notebook 34 can include projects which are collaborative workspaces for organizing and documenting data science assets, such as notebook sessions and models. Data science notebook sessions are interactive coding environments for building and training models. Notebook sessions can come with many preinstalled open source and previously developed machine learning and data science packages.

On-premises layer 108 further includes notebook profiles 32. Notebook profile 32 is an abstraction of permission sets available on-premises for the corresponding notebook, such as level of access available for collaborators 125 for each dataset 36, model 38 and library 40. The profile functions as the pillar of interaction and a source of truth for the trust levels with collaborators 125. A profile may be restrictive for one collaborator 125 or for many collaborators 125. In embodiments, there can be one notebook profile 32 per collaborator that can be applied on a notebook. The same profile 32 can be applied to multiple notebooks for the single respective collaborator 125.

For example, there may be a profile 32 named "pre-trained models" for a collaborator which provides only access to pre-trained models 38 (i.e., models that have been trained) but not the datasets 36 and libraries 40 that may be used by customer 112 to train the model. The collaborator that is granted with this profile can experiment with their own datasets on cloud 104. The collaborator can provide their own inputs to the model using their dataset. For example a credit scoring model can be shared with a collaborator who can experiment with it by providing their own data. Similarly, a profile 32 may correspond to an untrained model that allows a collaborator to train the model using their own dataset.

As another example, there may be a profile 32 that gives limited access to a sample of datasets 36 (i.e., a synthetic dataset or a proxy) plus a model 38. This will help the collaborators 125 to understand the underlying datasets and models as well. A full access profile may provide access to underlying libraries 40 which are proprietary in nature. Profiles 32 can be added, modified and removed based on business requirements and context of interactions. Profiles 32 are translated into a permission list and restrictions as disclosed below. Because multiple profiles 32 may be available to a particular collaborator, that collaborator can be assigned with different profiles for different notebooks. Table 1 below provides some further examples of the types of profiles 32 available in embodiments:

TABLE 1

| Profile | Permission list | Use cases |
| --- | --- | --- |
| Data Profile | Access to data read only<br>No model access<br>No library access | Data visualization & exploration<br>Data profile analysis |
| Pre-trained model profile | Access to execute pre-trained model outputs<br>No library access<br>Send data to on prem access<br>No storage access on prem, applicable per request | Execute prediction from model by passing inputs |
| Full access profile | Access to execute pre-trained model outputs<br>Access to execute library<br>Send data to on-prem access<br>No storage access on-prem, applicable per request | Execute prediction from model by passing inputs end to end including libraries associated<br>Only output access from the model and library |

Cloud server 105, or the cloud layer, includes an identity and access management ("IAM") on-premises connector 42. Connector 42 transforms profiles 32 into a cloud policy set which enables the sharing for collaborators 125. In general, the policies for on-premises layer 108 and for cloud layer 105 will be different. Connector 42 maps the different policies. Connector 42 is the glue layer or translation layer for applying such rules and policies dynamically based on the notebook profile chosen. The configuration of connector 42 can be controlled at both cloud 105 and by customer 112 to ensure they are compliant with both the cloud and on-premises policies. Connector 42 in embodiments is configuration driven and easy to manage via a rule engine that can evaluate the applied permissions.

For example, in one embodiment system 100 can use a traditional access control list ("ACL") type of security configuration. An ACL is a list of permissions associated with a system resource (i.e., an object). An ACL specifies which users or system processes are granted access to objects, as well as what operations are allowed on given objects. Each entry in a typical ACL specifies a subject and an operation. For example, if a file object has an ACL that contains (Alice: read,write; Bob: read), this would give Alice permission to read and write the file and only give Bob permission to read it. The mapping is done in conjunction with cloud policies and permissions by connector 42.

Connector 42 will translate the ACL policies to cloud policies and permissions in order to provide a handshake. Translation of policies in embodiments are implemented through an automation process where the formats are converted through mapping. In embodiments, a mapping process can be implemented via a tracking tool such as "Terraform" to ensure that they are tracked.

In another example, system 100 can use active directory ("AD") or other legacy integrations that maintain the list of users, groups, and permissions for resources associated in a directory of a hierarchical nature, such as Lightweight Directory Access Protocol ("LDAP"). LDAP is an open, vendor-neutral, industry standard application protocol for accessing and maintaining distributed directory information services over an Internet Protocol ("IP") network. Directory services allow the sharing of information about users, systems, networks, services, and applications throughout the network. As examples, directory services may provide any organized set of records, often with a hierarchical structure, such as a corporate email directory. Similarly, a telephone directory is a list of subscribers with an address and a phone number. In this example, connector 42 translates the lists into the cloud constructs and policies layer. In embodiments, the policies layer is the translation layer for converting the mapping via a script implemented via Terraform and a "shephard" tool.

Figure 4:
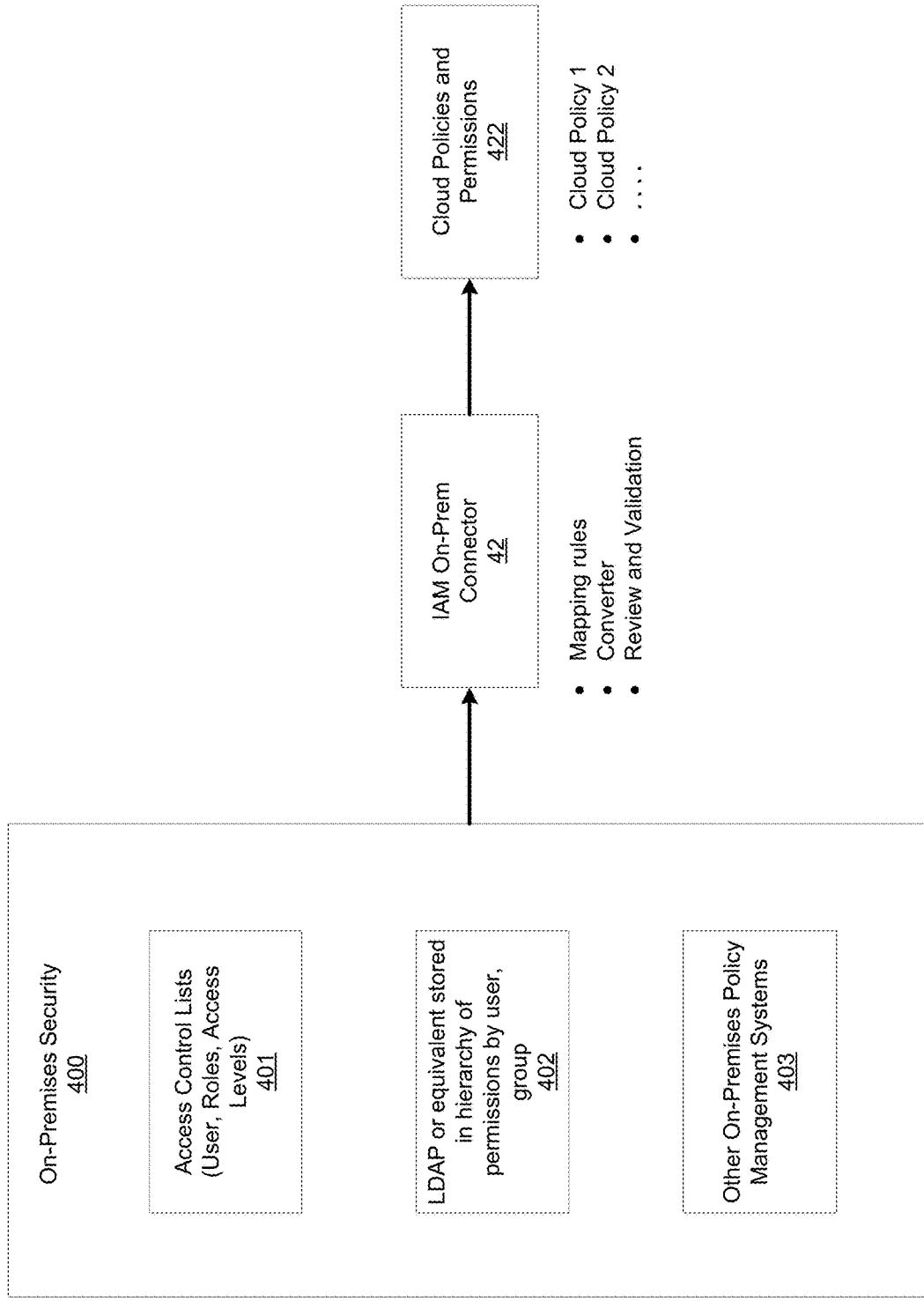
FIG. 4 is a block diagram illustrating the functionality of the IAM on-premises connector of FIG. 3 is accordance to embodiments.

FIG. 4 is a block diagram illustrating the functionality of IAM on-premises connector 42 of FIG. 3 is accordance to embodiments. FIG. 4 illustrates the process of reviewing and validating the respective permission construction based on mapping rules and conversions that occur in connector 42. The on-premises constructs are created as cloud policies to manage the interaction of various permissions.

As shown in FIG. 4, on-premises security (i.e., security mechanisms that may be implemented on on-premises layer 108), can include one or more of ACL 401, LDAP 402 or other types of policy management systems 403. In embodiments, connector 42 uses mapping rules and a converter, where the mapping rules and conversion involves converting permission lists that might be in a format such as .xml, flat file, etc. at on-premises 108 to a cloud software development toolkit ("SDK") API layer where policies and permissions are created using representational state transfer ("REST") APIs. A separate mapping may exist for each different pair of customer 112 and a collaborator 125 that may exist. In other embodiments, LDAP to OAuth translation is implemented by connector 42, where the cloud provider OAuth is linked to the on-premises LDAP layer via OAuth tokens being generated based on the LDAP credentials.

Referring again to FIG. 3, cloud layer 105 further includes a notebook secure plugin 44. Plugin 44 is a data/network component responsible for transferring and managing at runtime the data/assets based on the profiles and connector interactions. Plugin 44 is an implementation layer that can be written for an on-premises notebook using notebook controls for managing all the assets and works dynamically by referring to the policies and profiles in the connector framework. In embodiments, plugin 44 can also restrict cell access at the notebook level so that the cells are masked or removed based on the access permission level. In general, a notebook includes a sequence of cells, and each cell can be a multiline input field. A cell is a multiline text input which contains code to accomplish certain tasks. Some cells might include code that is of a secretive nature that needs to be hidden while still allowing certain privileges by collaborators. For example, if a collaborator want to use a model 38 on-premises, the collaborator can execute the model and then receive the output via a notebook 46 on the cloud. The collaborator does not know where the execution occurs, on-premises or on the cloud.

Cloud layer 104 further includes cloud notebooks 46 and models 48 that are available to collaborators 125.

Figure 5:
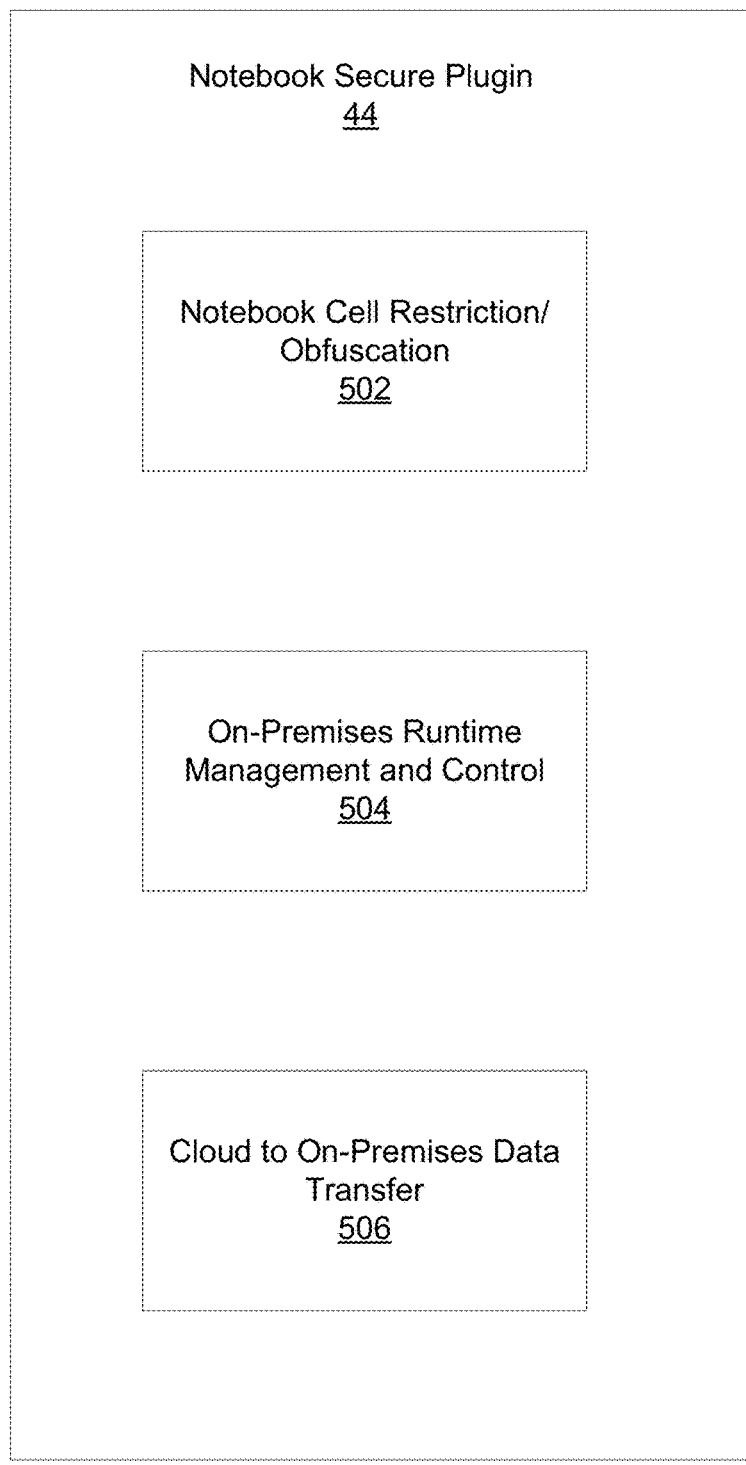
FIG. 5 is a block diagram of the notebook secure plugin of FIG. 3 in accordance to embodiments.

FIG. 5 is a block diagram of notebook secure plugin 44 of FIG. 3 in accordance to embodiments. Plugin 44 in embodiments includes a notebook cell restriction/obfuscation module 502, which has a functionality disclosed below.

Plugin 44 further includes an on-premises runtime management and control module 504 that is responsible for managing the runtime execution of providing access to collaborator 125 to various elements of on-premises server 108. The inputs are streamed to on-premises notebook service 34 and the outputs are passed to the cloud notebook layer 46 in a secure manner. In embodiments, the inputs are the python commands that need to be executed by the on-premises notebook server and the outputs are the results of those commands which are streamed back to the cloud One example includes executing a library 40 at on-premises 108 that is not exposed/available to collaborator 125 but the output results of the library is used as an input step in the next cell of the notebook. The on-premises library 40 may be a natural language processing related library where it provides specific scores on certain words from the input data to classify the text for the collaborator 125 and further label the text. The collaborator 125 does not need to know what type of algorithms are used internally by the on-premises notebook 34 while it consumes the output from the on-premises library at run time while executing the next set of cells. The cells may therefore be shown in an obfuscated manner to collaborator 125 as implemented by restriction/obfuscation module 502, disclosed in more detail below. Specifically, the cells may only display placeholder comments as provided by the notebook owner for the obfuscated cell.

Plugin 44 further includes a cloud to on-premises data transfer module 506 that is responsible for managing the data transfers from collaborator 125 to on-premises 108, and vice versa. The data is passed to on-premises 108 at run time for execution and removed after the interaction/session/execution. Similarly, the data is passed to collaborator 125 at run time for execution and can be removed after the interaction is completed. This ensures that there is no data footprint left on-premises and/or at the collaborator based on policies (e.g., the data provide by collaborator 125 can only be used by customer 112 only for training a model, it cannot be copied, etc.). The policies can be dictated as part of the predefined profiles. Encryption can also be used so the data, once a collaboration with a collaborator 125 has been completed, cannot be used by customer 112. As one example, a collaborator 125 may want to share and augment training datasets 36 for the models 38 which are not exposed to them. They can pass the data to on-premises 108 to train and improve the model accuracy.

For example, a partner/collaborator 125 with customer 112 working on drug discovery collaboration can share data with customer 112 for training the existing model 38 for a specific market while the model 38 is trained on other regions (e.g., Europe or America). Therefore, the collaborators can further train the model with their datasets without changing the model logic. The model becomes better in terms of accuracy with the new dataset specific to that particular region. The model training occurs on-premises. The model is never transferred over the cloud and when the training is done, a "joint-research" contract between a collaborator and customer 112 can end.

Notebook profile 32 defines such profiles where the access is restricted to "data only" in such scenarios where the partner/collaborator can execute training by supplying local region specific datasets. The dataset comes from the collaborator to on-premises. The model is given to the collaborator without details or logic about the model. The collaborator is simply using a training process to supply the dataset they have to improve the model accuracy.

Figure 6:
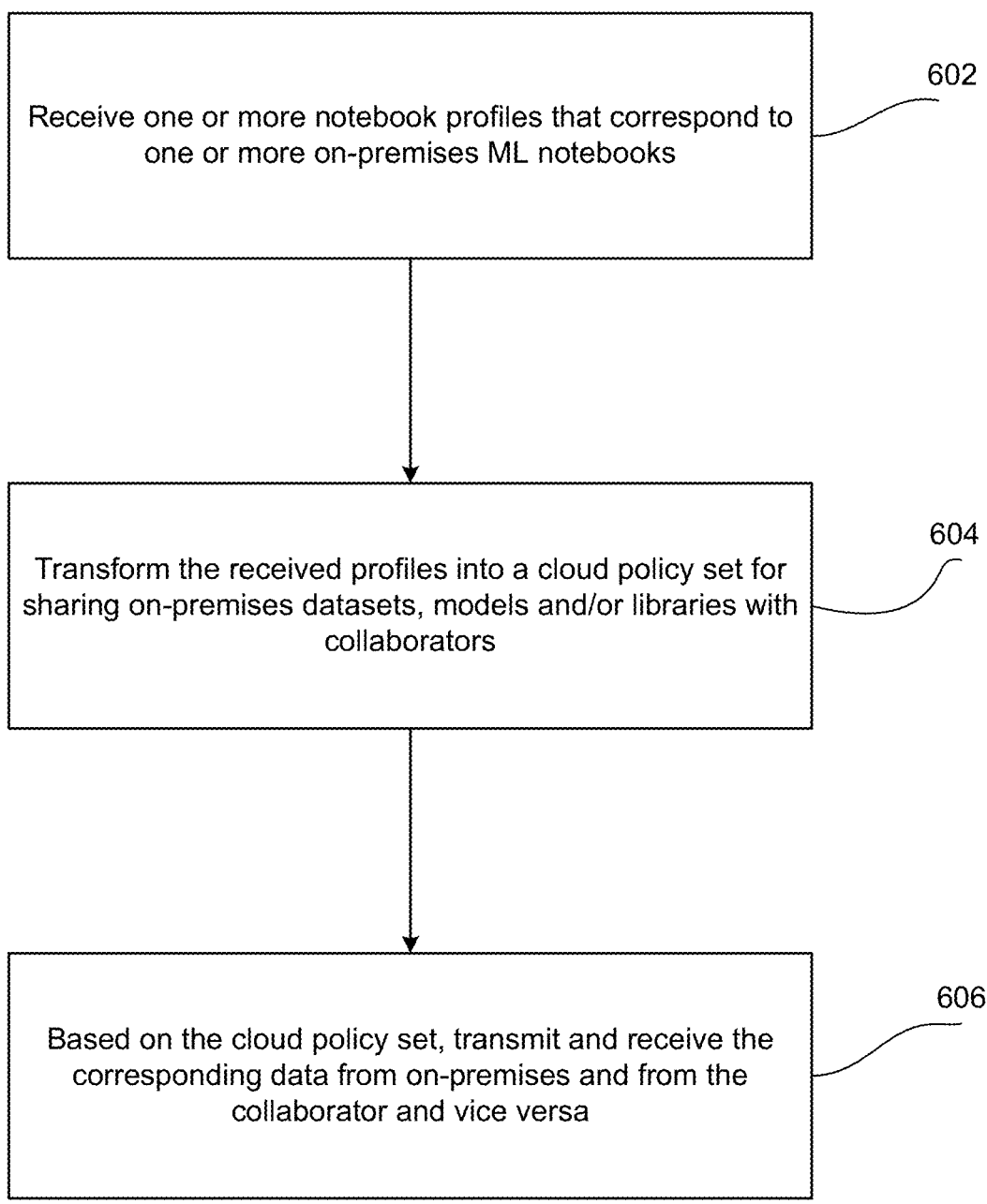
FIG. 6 is a flow diagram of the functionality of the system of FIG. 1 for using machine learning notebooks to securely and selectively share on-premises models, datasets and libraries in accordance with one embodiment.

FIG. 6 is a flow diagram of the functionality of system 100 of FIG. 1 for using machine learning notebooks to securely and selectively share on-premises models, datasets and libraries in accordance with one embodiment. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, cloud 104 receives one or more notebook profiles that correspond to one or more ML notebooks implemented on on-premises system 10. On-premises system 10 includes one or more of datasets 36, models 38 and libraries 40 that may be available to collaborators 125. Each notebook profile includes permission sets that specify a level of access to datasets 36, models 38 and libraries 40. For example, the permission set can be ACL or LDAP based permission sets.

At 604, IAM on-premises connector 42 on cloud 104 transforms the received profiles into a cloud policy set for sharing the datasets 36, models 38 and libraries 40 with collaborators 125. In embodiments, a cloud policy set specifies who can access which cloud resource, and how. A policy allows a group to work in certain ways with specific types of resources. In embodiments, each policy of a cloud policy set includes one or more policy statements that follow this basic syntax:

Allow group <group name> to <verb><resource-type> in compartment <compartment name>

At 606, notebook secure plugin 44 on cloud 104, based on the cloud policy set, transmits and receives the corresponding data from on-premises 108 and to collaborator 125, and vice versa.

Notebook Cell Obfuscation and Restriction

As disclosed above, in embodiments, plugin 44 can also restrict cell access at the notebook level so that the cells are masked or removed based on the access permission level. In one embodiment, the functionality is implemented in conjunction with the secure on-premises to cloud connector framework functionality disclosed above. In other embodiments, the functionality can be used in any environment where restricting cell access at a notebook level is needed. For example, one cloud user of cloud 104, using plugin 44 on cloud 105, can restrict/obfuscate/mask any number of cells from a notebook 46 when sharing that notebook to another cloud user of cloud 104. For example, a cell can be obfuscated while sharing and the proprietary algorithm behind it can be secured and shared for experimentation at the same time. Cells can be restricted at a group level, user level, etc.

Figure 7:
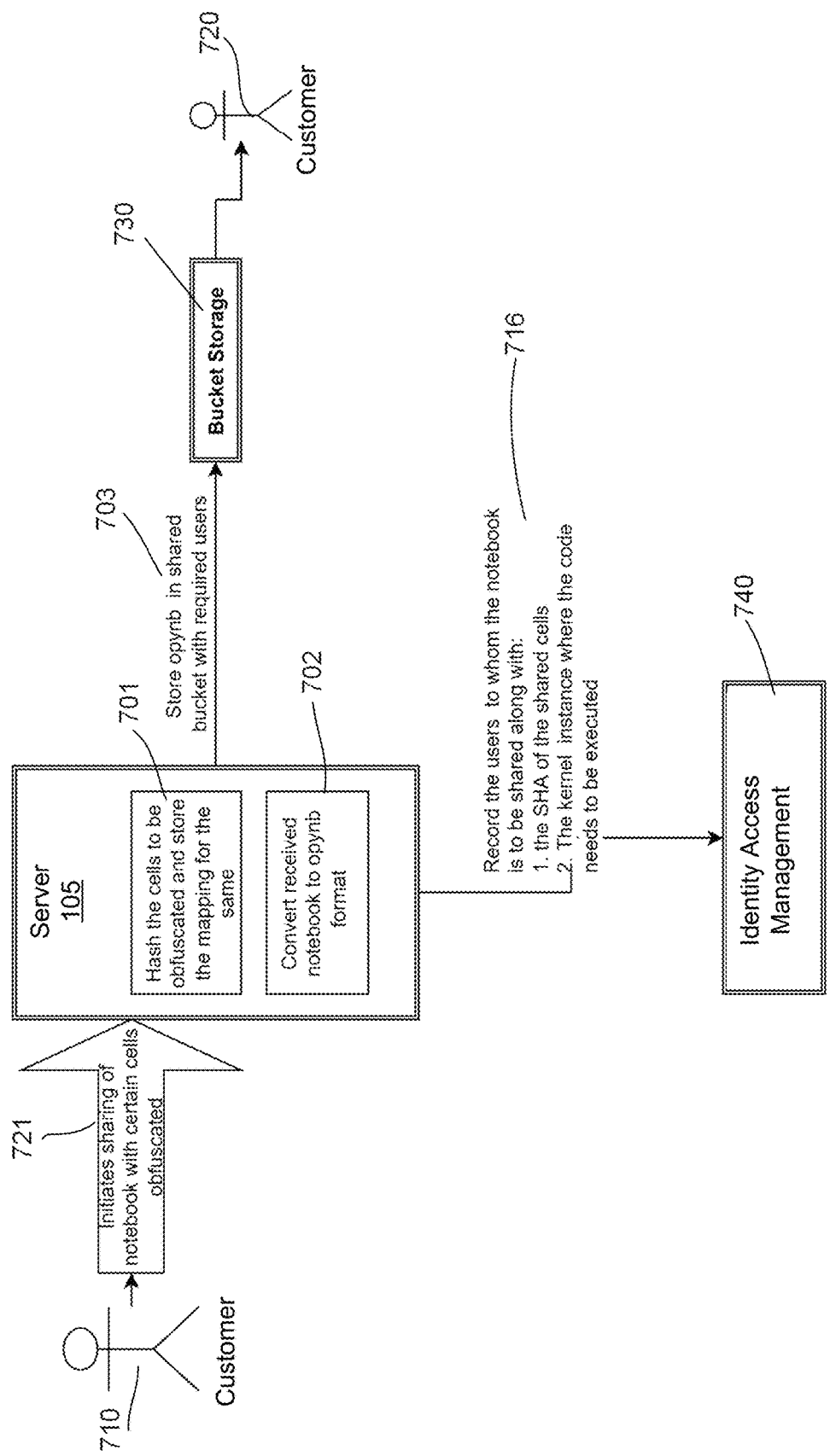
FIG. 7 is a block diagram and flow diagram illustrating the functionality of the notebook secure plugin of the cloud layer for generating notebook cell obfuscation and restriction in accordance to embodiments.

FIG. 7 is a block diagram and flow diagram illustrating the functionality of notebook secure plugin 44 of cloud layer 105 for generating notebook cell obfuscation and restriction in accordance to embodiments. Within notebook secure plugin 44, notebook cell restriction/obfuscation 502 is responsible for managing and displaying the notebook cells restriction based on permissions. In the example of FIG. 7, a cloud customer 710 (i.e., a customer of cloud 104) desires to share a cloud based ML notebook with certain cells obfuscated/restricted with another cloud customer 720 (i.e., a customer of cloud 104). Customer 710 interacts with cloud server 105.

In general, the cell or group of cells can be shown as a locked or masked manner in the notebook. This will be achieved through a secure hash algorithm ("SHA") encryption technique at every cell level based on the permissions and profile access.

When customer 710 issues a command to share a notebook with hidden cells at 721, a cloud notebook server receives the command and encrypts the cells required to be masked and forwards the contents to server 105. Server 105 at 701 hashes the cell contents to be obfuscated and stores the contents/mapping (i.e., the hash key/value mapping) along with the identities of people who can use the hash to execute the cell. At 702, the received notebook is converted to Oracle Python Notebook ("opynb") format or any new specialized format that includes custom fields and at 703 is stored in a bucket storage 730 (i.e., a shared file storage system) and shared with the intended customer 720. A conversion will then remove these custom fields and get the obfuscated fields from server 105 if the user has permission, thereby converting it to a generic python notebook format.

Further, at 716, the users to whom the notebook is to be shared is recorded along with the SHA of the shared cells, and the kernel instance where the code needs to be executed on an Identity Access Management ("IAM") service 740. Therefore, at 716, embodiments tell IAM service 740 through API calls as to which cells can we executed by which users.

Figure 8:
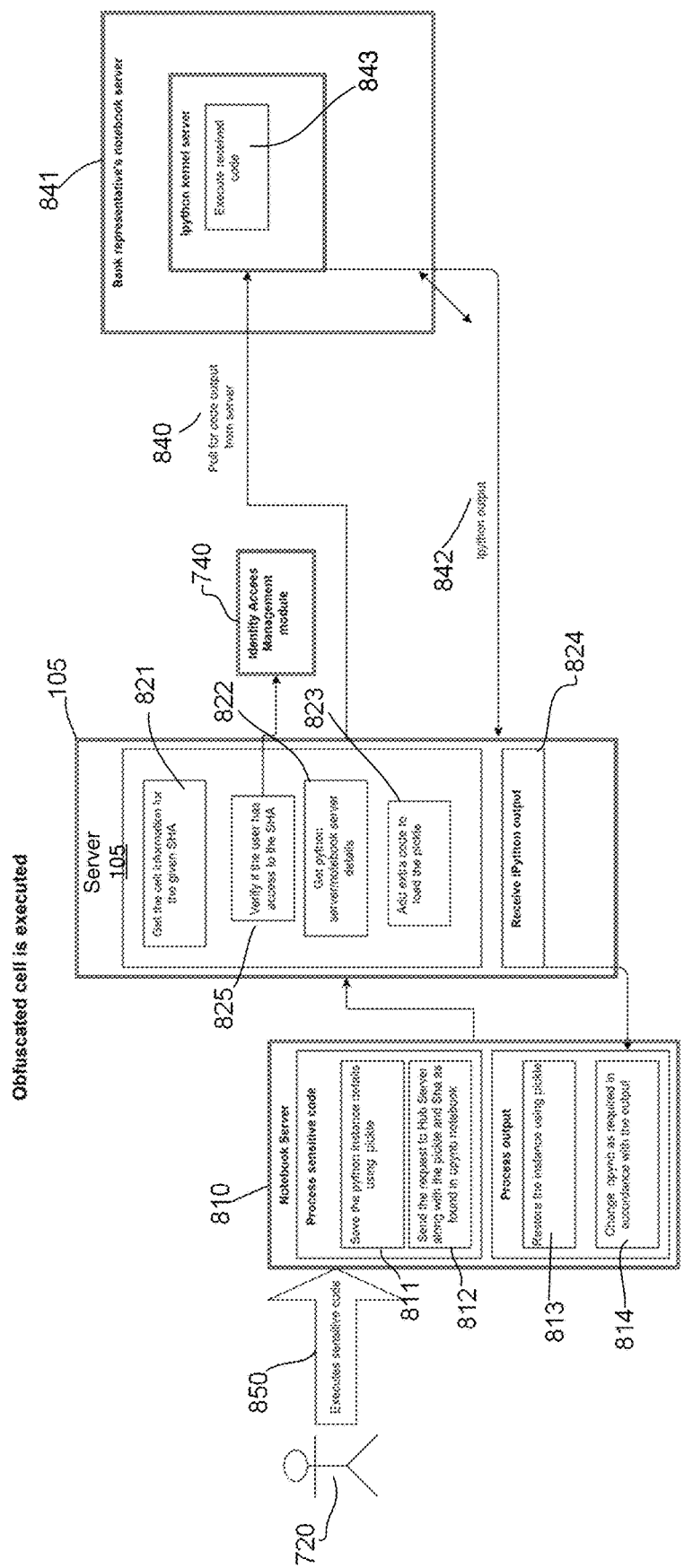
FIG. 8 is a block diagram and flow diagram illustrating the functionality of the notebook secure plugin of the cloud layer for executing obfuscated notebook cells in accordance to embodiments.

FIG. 8 is a block diagram and flow diagram illustrating the functionality of notebook secure plugin 44 of cloud layer 105 for executing obfuscated notebook cells in accordance to embodiments. In FIG. 8, cloud customer 720 executes the sensitive/proprietary code (i.e., code in an obfuscated cell). The customer "executes" the cell from their perspective and in the background embodiments receive the hashed value that was generated by server 105 and find its mapping to the actual code. Embodiments then send that command to the notebook kernel server 810 to be executed.

FIG. 8 illustrates how an external customer 720 (e.g., a collaborator 125) can execute proprietary code of an obfuscated cell will be able to do the same securely and seamlessly. The functionality of FIG. 8 ensures that none of the data is leaked to external customer 720 without the permission of the owner of the data (customer 710) by securing the proprietary code inside cloud server 105 which can only be executed after the following two conditions are matched:

The external customer 720 has the correct SHA key.
The external customer 720 is authorized to execute the code by the owner which will be managed though IAM service 740

In detail, a notebook server 810 (e.g., a notebook server that can interact with a local kernel server) at 811 processes the sensitive code by saving the python instance details using pickle. Pickle in Python is primarily used in serializing and deserializing a Python object structure. In other words, it is the process of converting a Python object into a byte stream to store it in a file/database, maintain program state across sessions, or transport data over the network. At 812, the request is sent to server 105 along with the pickle and the SHA as found in the opynb notebook.

Server 105 at 821 processes the SHA and pickle by getting the cell information for the given SHA, and at 822 getting the python server/notebook server details. At 823, extra code is added to load the pickle. For example, a "dill" module in python can add the extra code as follows:

import dill
dill. dump_session('notebook_env.db')
and to load the env
import dill
dill. load_session('notebook_env.db')

At 840, the code output from the server is polled from a notebook server 841 of customer 710. In embodiments, whenever a notebook session is created, a corresponding notebook server is also created. In response, Ipython kernel server 843 executes the receive code and generates an ipython output at 842 which is sent to server 105 at 824. At 825, using IAM server 740, the user is verified if they have access to execute the code using SHA.

Using the ipython output 842, the output is processed at 813 to restore the instance using pickle, and the opynb is changed as required in accordance with the input. The following pseudo-code provides examples of a change:

```
"outputs": [
  {
    "data": {
      "text/plain": [
        "16"
      ]
    },
    "execution_count": 2,
    "metadata": { },
    "output_type": "execute_result"
  }
]
```

Even if someone manages to get past these security mechanisms disclosed above, they will not be able to see the code which is actually getting executed because the code is stored in encrypted format which can only be decrypted by the notebook owner's (customer 710) cloud notebook server.

The external customer (customer 720) also does not have to suffer with poor experience because of the additional security measures because the above functionality allows for the preserving of the python environment across execution by synchronizing the environment state using pickles. Therefore, customer 720 can execute the obfuscated code the same as any other code. For example, only values of certain variables can be selected to be shared.

Figure 9:
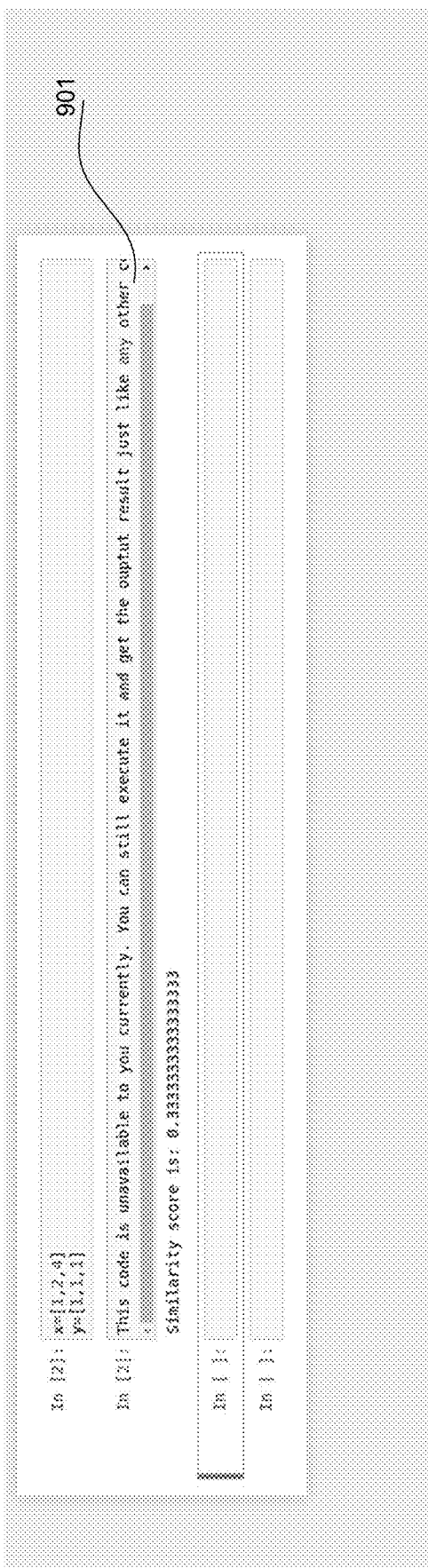
FIG. 9 illustrates a plurality of notebook cells with at least one cell obfuscated in accordance to embodiments.

FIG. 9 illustrates a plurality of notebook cells with at least one cell obfuscated in accordance to embodiments. Specifically, in the example of FIG. 9, customer 710 is sharing the notebook in which they has a proprietary scoring function in cell 901. As shown, no code is actually exposed to the customer with whom this notebook is shared and they are also able to execute the code seamlessly. Cell 901, if not obfuscated, would show the actual code being executed.

In embodiments that use Oracle Python Notebook ("Opynb") notebook format, this format supports secure sharing of data in addition to the features supported by the .ipynb notebook format (i.e., a notebook document created by a Jupyter Notebook). In this format there are two additional JavaScript Object Notation ("JSON") values that facilitate secure remote execution such as SHA, details on how to reach the notebook server, etc.: (1) Hash: hashed values for the obfuscated cell; and (2) Notebook Hub: server fully qualified domain name ("FQDN"). The format will be backwards compatible (i.e., any ipython notebook can be seamlessly converted to the Opynb format).

Example Cloud Infrastructure

FIGS. 10-13 illustrate an example cloud infrastructure that can incorporate the secure on-premises to cloud connector framework system in accordance to embodiments. The cloud infrastructure of FIG. 10-13 can be used to implement network/cloud 104 of FIG. 1. In one embodiment, notebook instances are run on a Data plane (described below) while the permissions and controls are managed in the Control plane layer (described below).

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
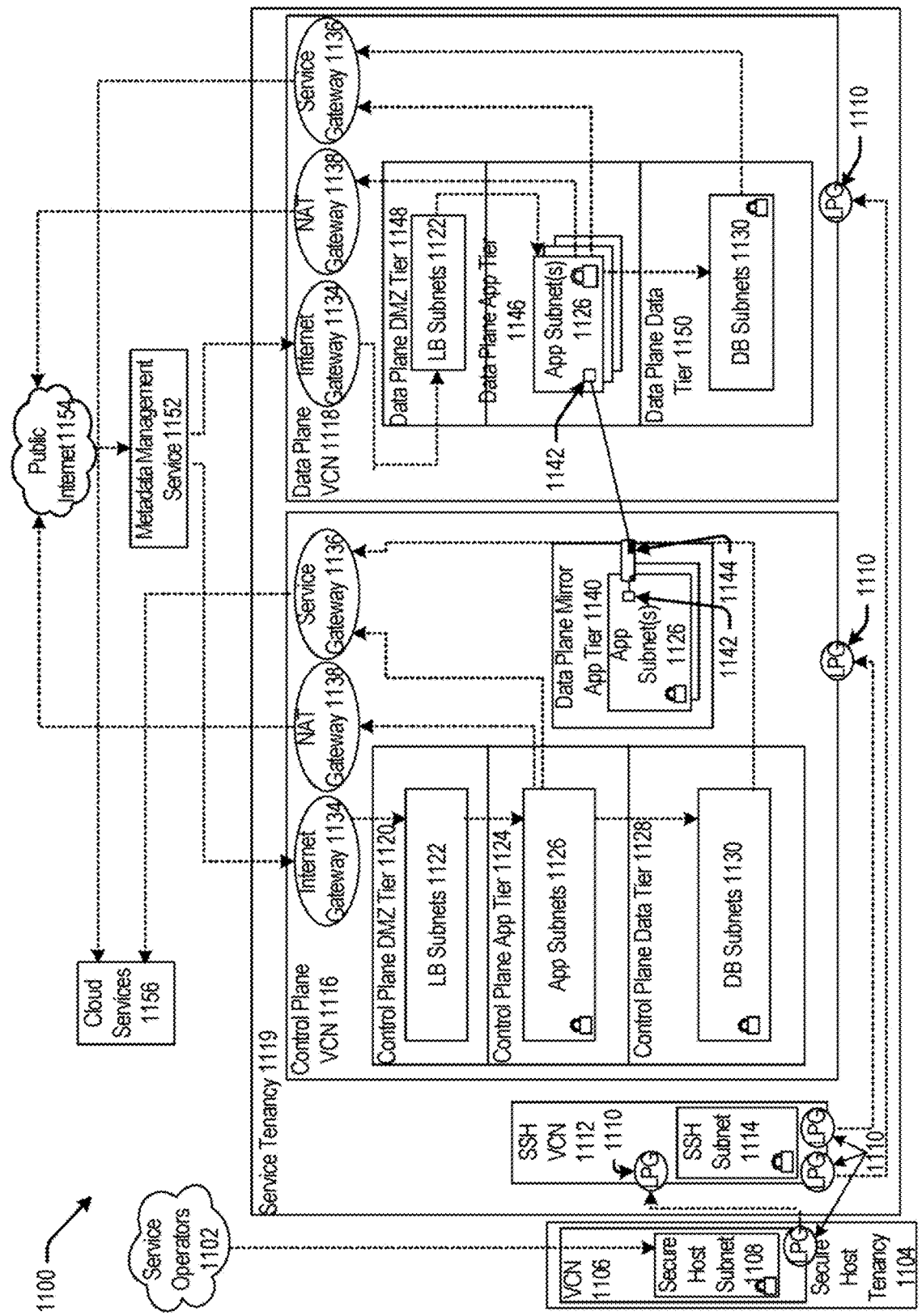
FIGS. 10-13 illustrate an example cloud infrastructure that can incorporate the secure on-premises to cloud connector framework system in accordance to embodiments.

FIG. 10 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 11:
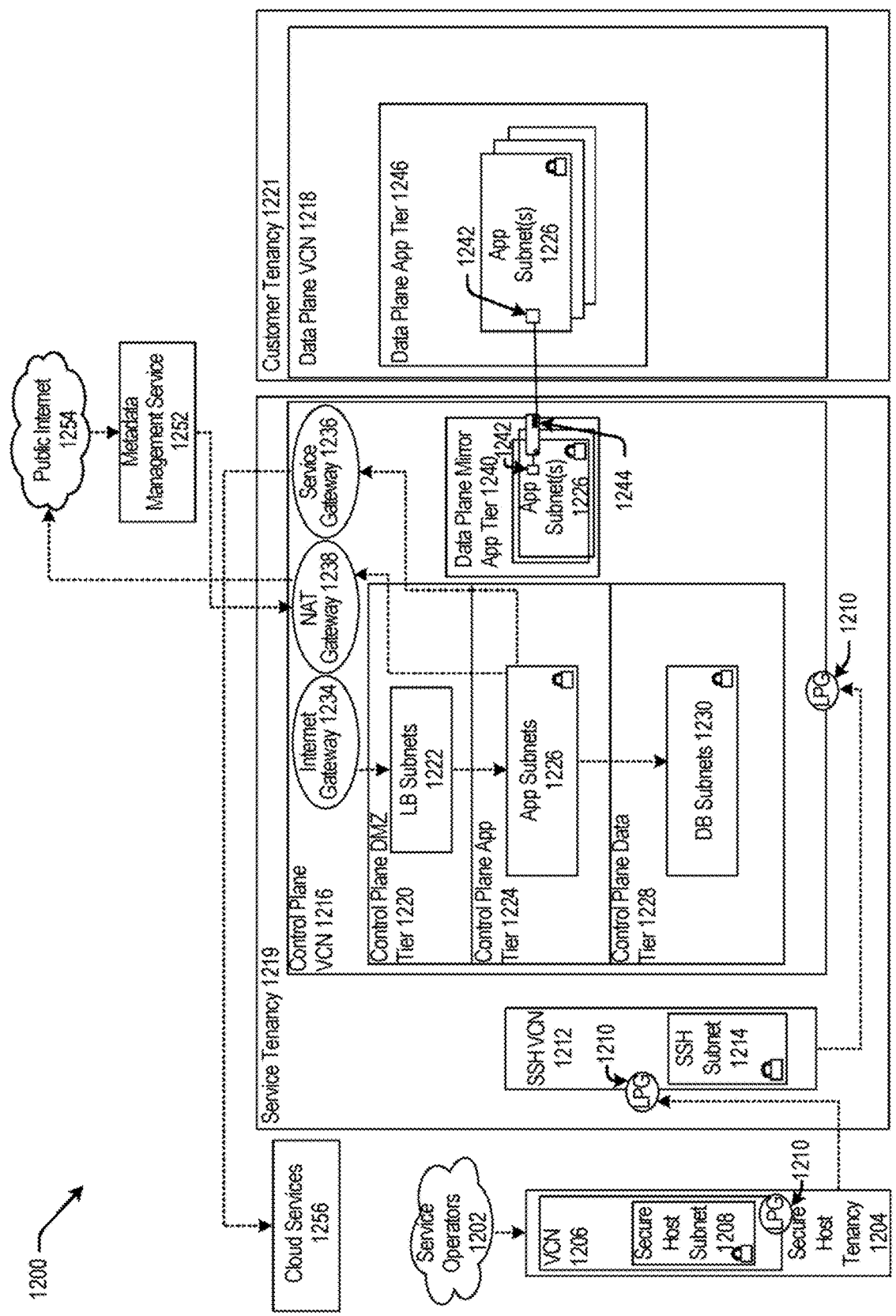

FIG. 11 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 12:
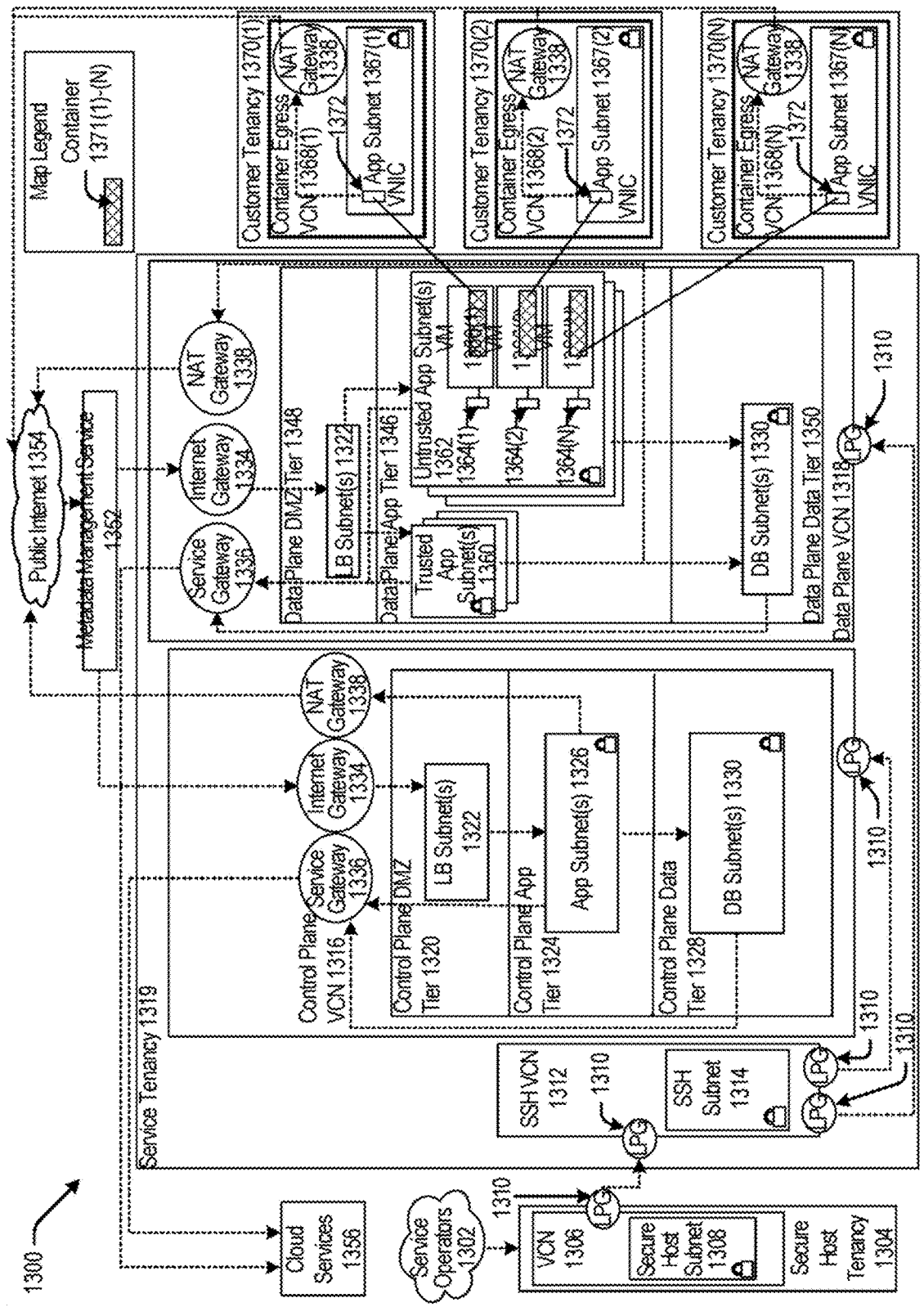

FIG. 12 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s)

1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371 (1)-(N) may be communicatively coupled to the customer tenancy 1370 and may be configured to transmit or receive data from the customer tenancy 1370. The containers 1371 (1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 13:
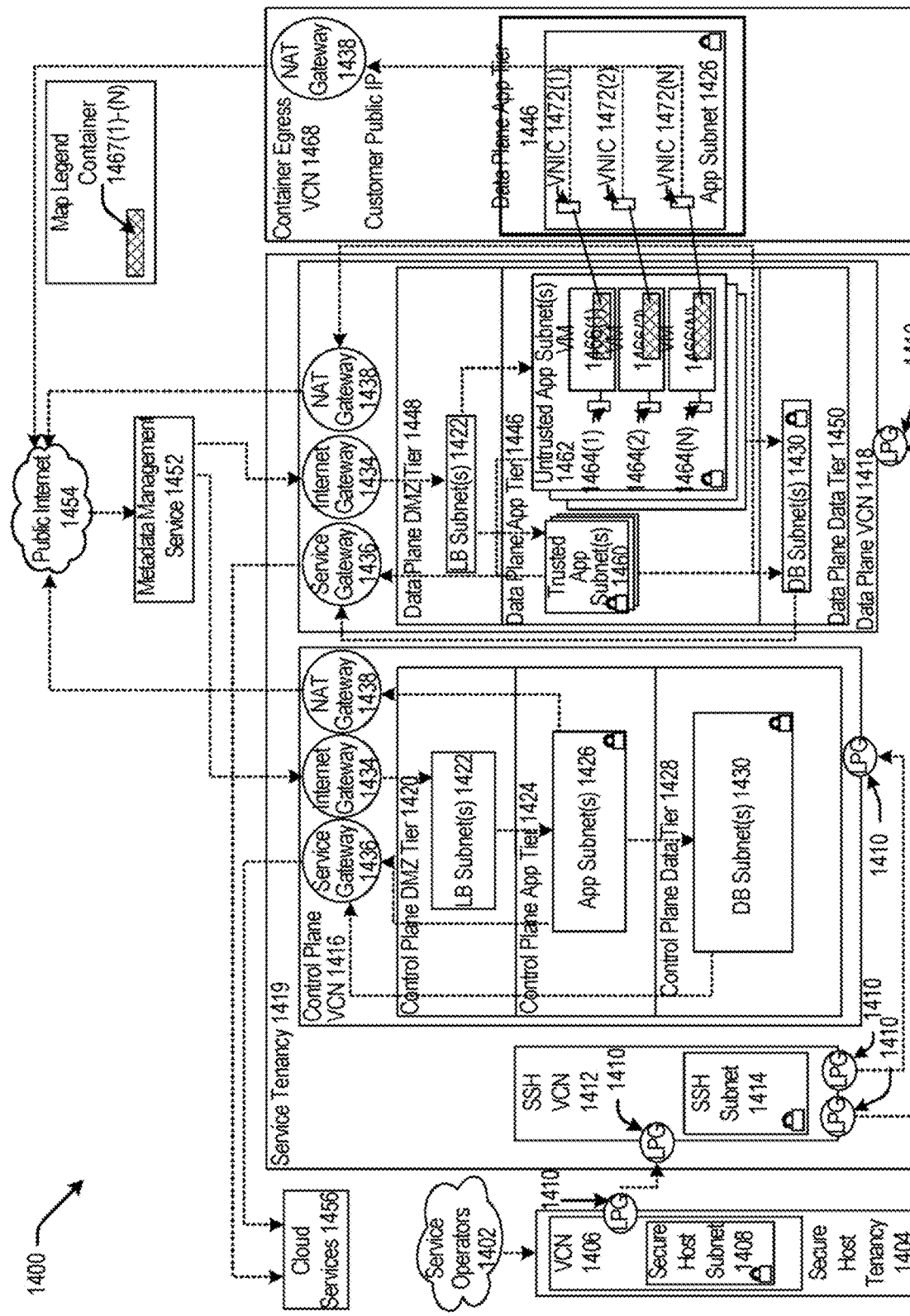

FIG. 13 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 13 may be considered an exception to the pattern illustrated by the architecture of block diagram 1300 of FIG. 12 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure ("OCI") provided by the present assignee.

As disclosed, embodiments provide a secure connector framework so that models, datasets and libraries can securely remain on-premises while being selectively shared with collaborators over a cloud to accommodate, for example, federated learning.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of implementing a secure connector framework comprising:
   at a cloud, receiving one or more notebook profiles from an on-premises system corresponding to a first cloud customer, the on-premises system comprising one or more machine learning (ML) models, the notebook profiles comprising permission sets that specify a level of access to the on-premises ML models, the notebook profiles corresponding to an on-premises ML notebook, wherein the ML notebook comprises an ML software environment for building ML models;

at the cloud, transforming the received notebook profiles into a cloud policy set for sharing the models; and at the cloud, transmitting and receiving corresponding data from the first cloud customer to a second cloud customer, the transmitted and received data based on the cloud policy set and allows the second cloud customer access to the one or more ML models while the ML models are on-premises at the first cloud customer in accordance with the permission sets, the permissions sets providing access control for the second cloud customer for the one or more ML models.

2. The method of claim 1, the on-premises system further comprising one or more datasets, wherein the notebook profiles comprise a first notebook profile that allows the second customer access to a first trained on-premises model of the one or more ML models, and prevents the second customer to access the one or more data sets.

3. The method of claim 1, the on-premises system further comprising one or more datasets, wherein the notebook profiles comprise a second notebook profile that allows the second customer access to a first untrained on-premises ML model of the one or more ML models, and prevents the second customer to access the one or more datasets.

4. The method of claim 1, the on-premises system further comprising one or more datasets, wherein the notebook profiles comprise a third notebook profile that allows the second customer access to a first untrained on-premises ML model of the one or more ML models, and access to only a subset of the one or more datasets.

5. The method of claim 1, the on-premises system further comprising one or more datasets and one or more libraries, wherein the notebook profiles comprise a fourth notebook profile that allows the second customer access to the one or more ML models, the one or more datasets and the one or more libraries.

6. The method of claim 1, the on-premises system further comprising one or more datasets and one or more libraries, wherein the one or more datasets, the one or more ML models, and the one or more libraries are not stored on the cloud.

7. The method of claim 1, the transmitting and receiving occurring during a cloud interaction by the first customer and the second customer, further comprising:
deleting the data received by the first customer and the second customer during the cloud interaction when the cloud interaction ends.

8. The method of claim 1, wherein the permission set is based on an Access Control List (ACL) or a Lightweight Directory Access Protocol (LDAP).

9. A non-transitory computer readable medium having instructions stored thereon that, when executed by one or more processors on a cloud infrastructure, cause the processors to provide a secure connector framework, the secure connector framework comprising:
receiving one or more notebook profiles from an on-premises system corresponding to a first cloud customer, the on-premises system comprising one or more machine learning (ML) models, the notebook profiles comprising permission sets that specify a level of access to the on-premises ML models, the notebook profiles corresponding to an on-premises ML notebook, wherein the ML notebook comprises an ML software environment for building ML models;
transforming the received notebook profiles into a cloud policy set for sharing the models; and
transmitting and receiving corresponding data from the first cloud customer to a second cloud customer, the transmitted and received data based on the cloud policy set and allows the second cloud customer access to the one or more ML models while the ML models are on-premises at the first cloud customer in accordance with the permission sets, the permissions sets providing access control for the second cloud customer for the one or more ML models.

10. The computer readable medium of claim 9, the on-premises system further comprising one or more datasets, wherein the notebook profiles comprise a first notebook profile that allows the second customer access to a first trained on-premises model of the one or more ML models, and prevents the second customer to access the one or more data sets.

11. The computer readable medium of claim 9, the on-premises system further comprising one or more datasets, wherein the notebook profiles comprise a second notebook profile that allows the second customer access to a first untrained on-premises ML model of the one or more ML models, and prevents the second customer to access the one or more datasets.

12. The computer readable medium of claim 9, the on-premises system further comprising one or more datasets, wherein the notebook profiles comprise a third notebook profile that allows the second customer access to a first untrained on-premises ML model of the one or more ML models, and access to only a subset of the one or more datasets.

13. The computer readable medium of claim 9, the on-premises system further comprising one or more datasets and one or more libraries, wherein the notebook profiles comprise a fourth notebook profile that allows the second customer access to the one or more ML models, the one or more datasets and the one or more libraries.

14. The computer readable medium of claim 9, the on-premises system further comprising one or more datasets and one or more libraries, wherein the one or more datasets, the one or more ML models, and the one or more libraries are not stored on the cloud.

15. The computer readable medium of claim 9, the transmitting and receiving occurring during a cloud interaction by the first customer and the second customer, the secure connector framework further comprising:
deleting the data received by the first customer and the second customer during the cloud interaction when the cloud interaction ends.

16. The computer readable medium of claim 9, wherein the permission set is based on an Access Control List (ACL) or a Lightweight Directory Access Protocol (LDAP).

17. A cloud infrastructure comprising:
a secure connector server configured to interact with an on-premises system, the secure connector server comprising one or more processors configured to:
receive one or more notebook profiles from an on-premises system corresponding to a first cloud customer, the on-premises system comprising one or more machine learning (ML) models, the notebook profiles comprising permission sets that specify a level of access to the on-premises ML models, the notebook profiles corresponding to an on-premises ML notebook, wherein the ML notebook comprises an ML software environment for building ML models;
transform the received notebook profiles into a cloud policy set for sharing the models; and
transmit and receive corresponding data from the first cloud customer to a second cloud customer, the transmitted and received data based on the cloud policy set and allows the second cloud customer access to the one or more ML models while the ML models are on-premises at the first cloud customer in accordance with the permission sets, the permissions sets providing access control for the second cloud customer for the one or more ML models.

18. The cloud infrastructure of claim 17, the on-premises system further comprising one or more datasets and one or more libraries, wherein the one or more datasets, the one or more models, and the one or more libraries are not stored on the cloud infrastructure.

19. The cloud infrastructure of claim 17, the transmitting and receiving occurring during a cloud interaction by the first customer and the second customer, further comprising:
   deleting the data received by the first customer and the second customer during the cloud interaction when the cloud interaction ends.

20. The cloud infrastructure of claim 17, wherein the permission set is based on an Access Control List (ACL) or a Lightweight Directory Access Protocol (LDAP).

\* \* \* \* \*